(12) United States Patent
Gretz (10) Patent No.: US 7,759,576 B1
(45) Date of Patent: Jul. 20, 2010

(54) LOW VOLTAGE MOUNTING DEVICE FOR DIRECT MOUNTING OF LOW VOLTAGE COMPONENTS TO DRYWALL

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 421 days.

(21) Appl. No.: 12/012,907

(22) Filed: Feb. 6, 2008

(51) Int. Cl.
*H01H 9/02* (2006.01)
(52) U.S. Cl. .................. 174/58; 174/480; 174/481; 174/520; 248/906; 439/535
(58) Field of Classification Search ............ 174/53, 174/54, 55, 57, 61, 63, 66, 67; 220/3.8, 3.6, 220/3.9; 248/906; 439/535; 361/730
See application file for complete search history.

(56) References Cited

U.S. PATENT DOCUMENTS

| 4,328,903 A | 5/1982 | Baars |
| 6,102,360 A | 8/2000 | Clegg et al. |
| 6,346,674 B1 | 2/2002 | Gretz |
| 6,508,445 B1 | 1/2003 | Rohmer |
| 6,750,398 B1 * | 6/2004 | Richardson ............ 174/58 |
| 7,186,916 B2 | 3/2007 | Jacks |
| 7,378,590 B1 * | 5/2008 | Herth ................. 174/50 |
| 7,549,549 B1 * | 6/2009 | Kiely .................. 220/3.7 |

* cited by examiner

*Primary Examiner*—Dhiru R Patel (57) ABSTRACT

A low voltage mounting device for installing low voltage components on a wall or ceiling. The low voltage mounting device includes a round frame member and a plurality of wings that are rotatable with respect to the frame member. The rotatable wings are fixed on the end of fasteners that extend through the frame member and are rotatable with respect thereto. An outward extending flange on the frame member enables flush mounting to the wall or ceiling surface. A low voltage component may be mounted directly to the frame member. The low voltage mounting device enables direct installation to the drywall and does not require mounting to a stud or other frame member.

18 Claims, 10 Drawing Sheets

LOW VOLTAGE MOUNTING DEVICE FOR DIRECT MOUNTING OF LOW VOLTAGE COMPONENTS TO DRYWALL

FIELD OF THE INVENTION

This invention relates to mounting devices for low voltage components and specifically to a low voltage mounting device that connects directly to the drywall on an interior wall.

BACKGROUND OF THE INVENTION

Several approaches exist for connecting low voltage components such as coax cable, fiber optic cable, communications cables, or similar low voltage and wire in new construction. Typically, a metal or plastic box is secured to the framework of a building during the roughing-out phase of construction with the drywall or other finishing wall material later applied over the box. The metal or plastic box is typically secured to the framework or studs of the building with fasteners such as nails or screws driven securely into the studs. While such an arrangement can provide a satisfactory mount for low voltage devices during the rough-out phase of construction, when the studs are unobstructed and accessible, it is not a valid method for mounting a low voltage component to a finished wall.

When mounting a low voltage mounting device to a finished wall, the installer must typically locate a stud and cut a hole in the drywall in the desired location. Since many low voltage mounting devices include captive fasteners, making a hole in the wall to accommodate the low voltage device typically requires the installer to create a hole large enough to provide access to the captive fasteners. Creating the hole for the low voltage mounting device however usually creates an oversize hole, which frequently forces the installer to repair the wall in the vicinity of the mounting device. Installing prior art low voltage mounting devices on finished walls is therefore inefficient and forces undesirable repair time.

What is needed therefore is a low voltage mounting device that can be easily and quickly installed on a finished wall. The low voltage mounting device should also be of simple design, easy to operate, and capable of being manufactured at low cost.

OBJECTS AND ADVANTAGES

The present invention provides a low voltage mounting device that can be installed easily and quickly on a wall or ceiling. All that is necessary for the mounting of the low voltage device is a simple hole saw and a screwdriver. Unlike prior art mounting devices that must be secured directly to the framework of a building, the low voltage mounting device of the present invention can be mounted in any desirable location and does not require mounting directly to the framing. Rotatable wings on the low voltage mounting device of the present invention enable rapid and precise mounting of low voltage components with a minimum amount of effort by the installer.

These and other advantages will be understood by reading the following detailed description in conjunction with reference to the attached drawings.

SUMMARY OF THE INVENTION

The present invention is a low voltage mounting device for installing low voltage components on a wall or ceiling. The low voltage mounting device includes a round frame member and a plurality of wings that are rotatable with respect to the frame member. The rotatable wings are fixed on the end of fasteners that extend through the frame member and are rotatable with respect thereto. An outward extending flange on the frame member enables flush mounting to the wall or ceiling surface. A low voltage component may be mounted directly to the frame member. The low voltage mounting device enables direct installation to the drywall and does not require mounting to a stud or other frame member.

INDEX TO REFERENCE NUMERALS IN DRAWINGS 20 low voltage mounting device
22 frame member
24 outer surface of frame member
26 inner surface of frame member
28 rotatable wing
30 boss
32 inner bore in boss
34 outer bore in boss
36 aperture
38 recessed area on outer surface of frame member 40 opening
42 inward extending flange
44 leg member
45 recessed area on inner surface of frame member
46 slot in inward extending flange
48 outer surface of leg
50 outward extending flange
52 rear surface of outward extending flange
54 shelf
56 support member or brace portion
57 arcuate outer surface of brace portion
58 distal end of leg
60 main leg portion
64 lateral axis across frame member
72 proximal end of wing
74 distal end of wing
76 foot
78 tab
80 flat face
82 bore in wing
84 adjustable fastener
86 fastening arrangement
88 outer periphery of frame member
90 hole
92 drywall
94 wall
96 cover plate
98 cover fastener
100 holes in cover plate
102 inner periphery of inward extending flange
Θ1 angle through which wings are rotated
D1 outer diameter of frame member
D2 outer diameter of inward extending flange

DETAILED DESCRIPTION OF THE INVENTION

Figure 1:
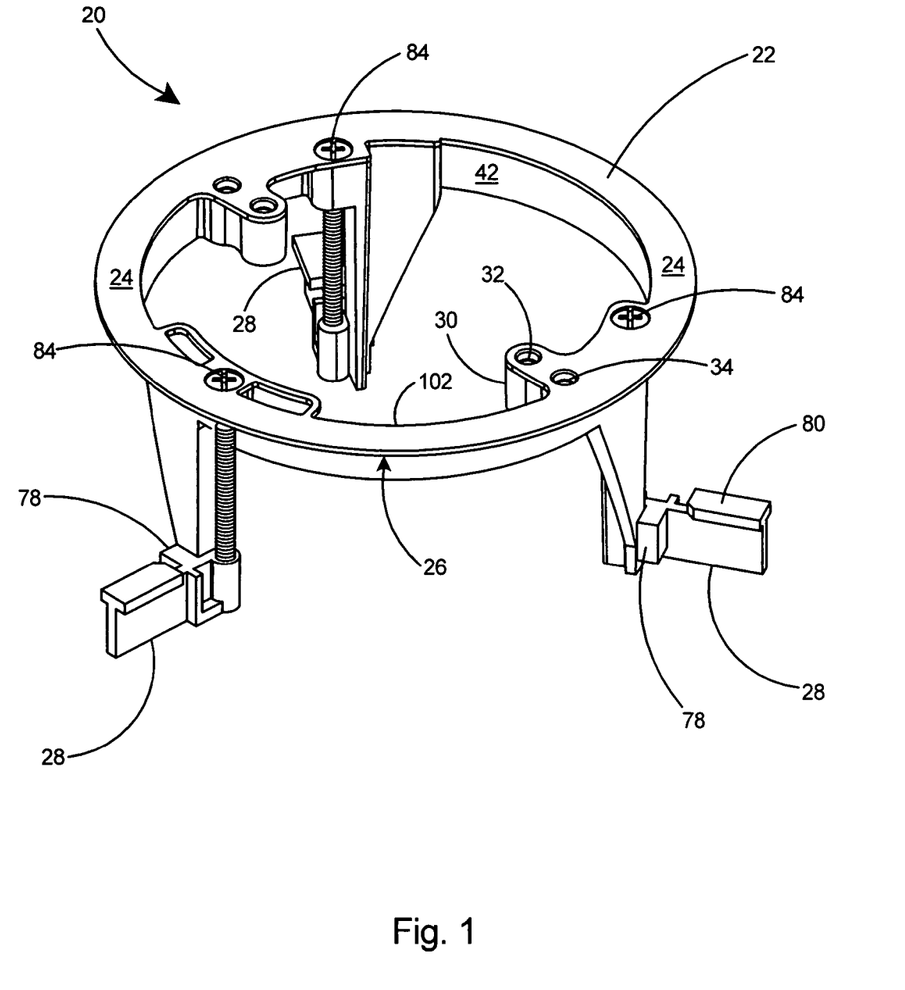
FIG. 1 is a perspective view of a preferred embodiment of a low voltage mounting device according to the present invention.

With reference to FIG. 1 there is shown a preferred embodiment of a low voltage mounting device 20 according to the present invention. The low voltage mounting device 20 includes a generally circular one-piece frame member 22 with an outer surface 24 and an inner surface 26 and a plurality of rotatable wings 28 adjustable from the outer surface 24 of the frame member 22.

Figure 2:
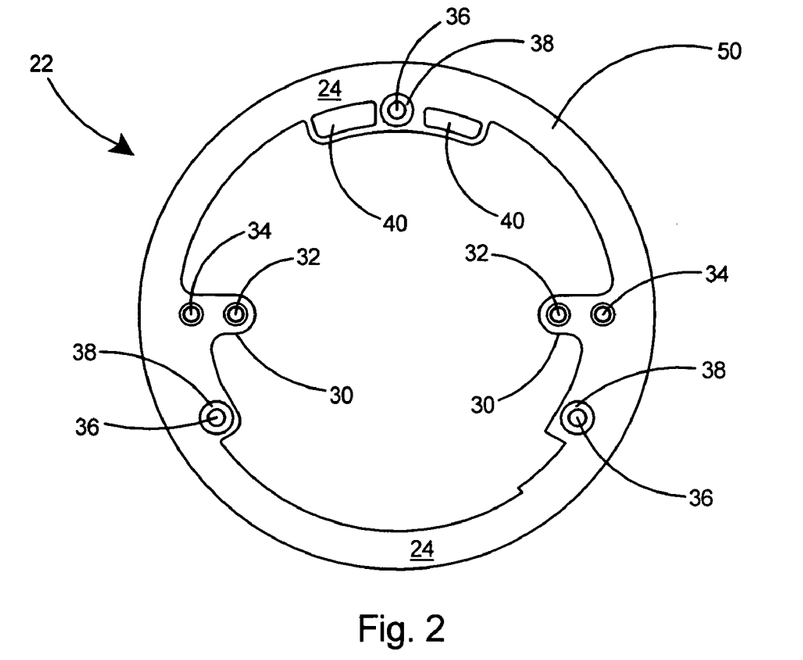
FIG. 2 is a top view of the frame member portion of the low voltage mounting device of FIG. 1.

Referring to the top view of the outer surface 24 of the frame member 22 in FIG. 2, the frame member 22 includes bosses 30 including inner bores 32 and outer bores 34 therein. The frame member 22 further includes apertures 36 with recessed areas 38 surrounding the apertures 36. Openings 40 are provided surrounding one of the recessed areas 38.

Figure 3:
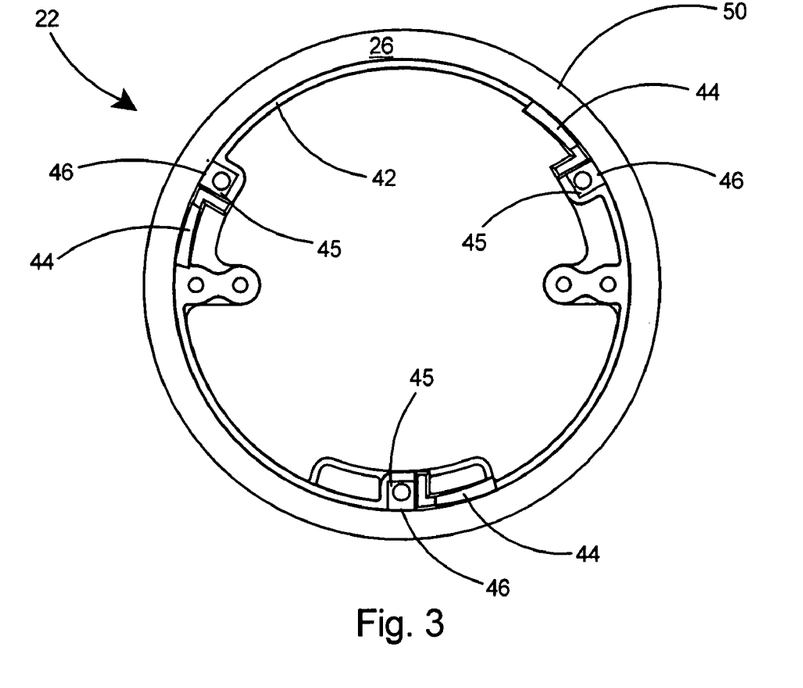
FIG. 3 is a bottom view of the frame member of FIG. 2.

With reference to the view of the inner surface 26 of the frame member 22 in FIG. 3, the frame member 22 includes an inward extending flange 42 and three leg members 44 extending from the inner surface 26. Located next to each leg 44 and surrounding aperture 36 are recessed areas 45 and slots 46 extending through the inward extending flange 42. As shown in FIG. 3, the legs 44 include outer surfaces 48 that are flush with the inward extending flange 42.

Figure 4:
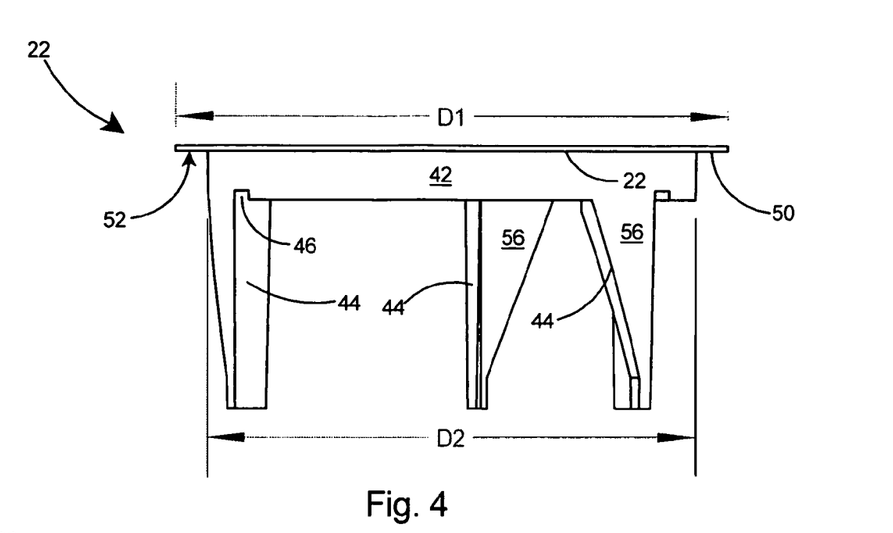
FIG. 4 is a side view of the frame member of FIG. 2.
Figure 5:
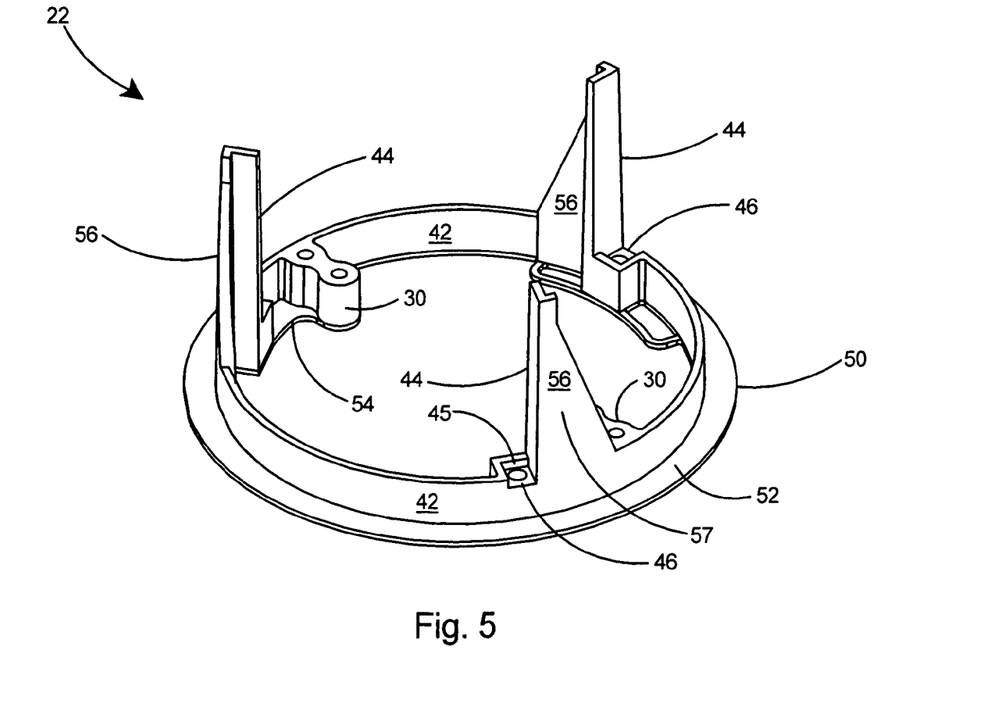
FIG. 5 is a perspective view of the frame member of FIG. 2.

With reference to FIGS. 4 and 5, the frame member 22 also includes an outward extending flange 50 having a rear surface 52. As shown in FIG. 5, the frame member 22 includes a shelf 54 bridging between each boss 30 and the adjacent leg 44 thereby strengthening and supporting the leg 44 and boss 30. A support member or brace portion 56 is provided surrounding the remaining leg 44 and extending from the inward extending flange 42 to brace the remaining leg member 44 with respect to the frame member 22. As shown in FIG. 5, the main portion of leg 44 is substantially planar and the outer surface of brace portion 56 is flush with the outer surface of the inward extending flange 42. The brace portion 56 of each leg 44 is an integral extension of the inward extending flange 42. The brace portion 56 further includes an arcuate outer surface 57 that is even or flush with the outer surface of the inward extending flange 42.

Figure 6:
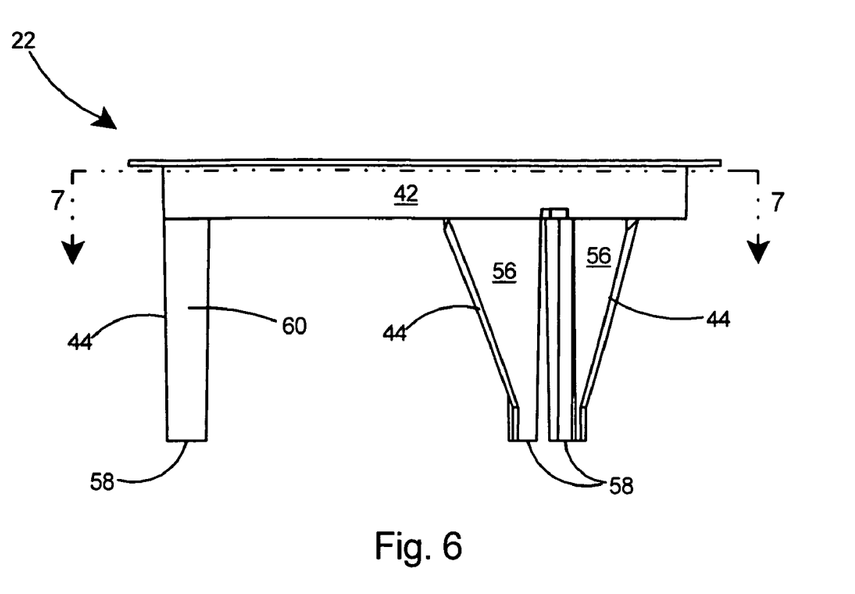
FIG. 6 is a side view of the frame member from a different perspective that that of FIG. 4.
Figure 7:
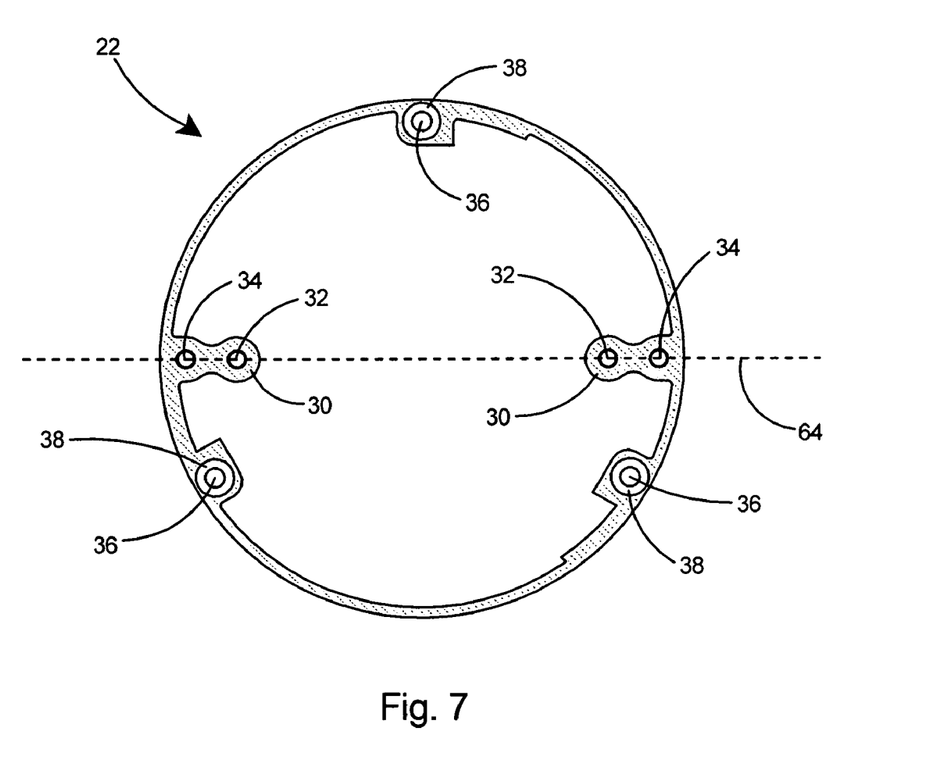
FIG. 7 is a sectional view of the frame member taken along line 7-7 of FIG. 6.

Referring to FIGS. 6 and 7, the legs 44 of the frame member 22 include distal ends 58, a main leg portion 60 and a brace portion 56 extending from the inward extending flange 42. As shown in the sectional view of FIG. 7, the bores 32 and 34 within bosses 30 are located 180 degrees apart along lateral axis 64. The recessed areas 38 surrounding apertures 36 are also shown.

Figure 8:
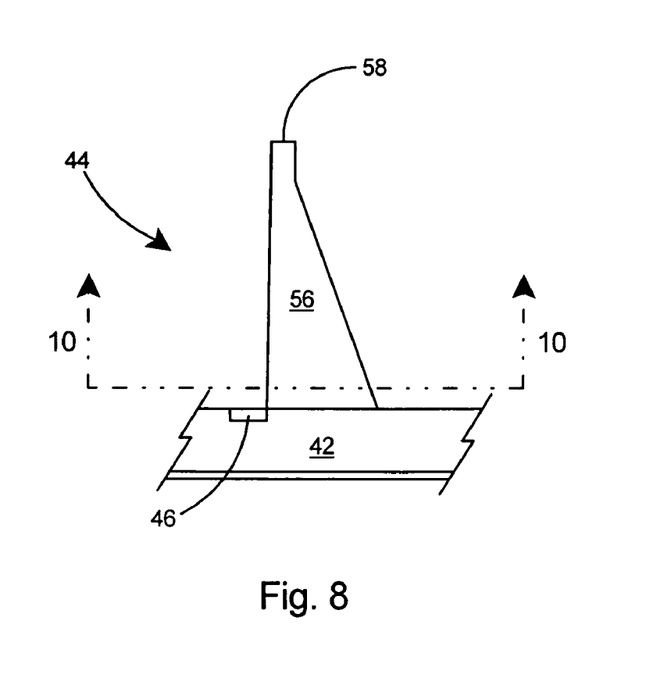
FIG. 8 is a detail view of a leg portion of the frame member of FIG. 6.
Figure 9:
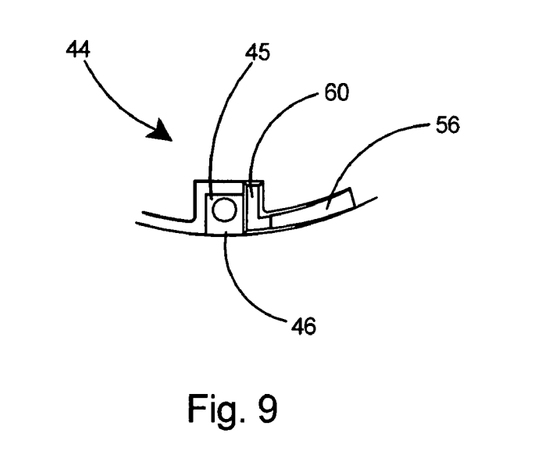
FIG. 9 is a view of the leg portion of the frame member taken from line 9-9 of FIG. 8.
Figure 10:
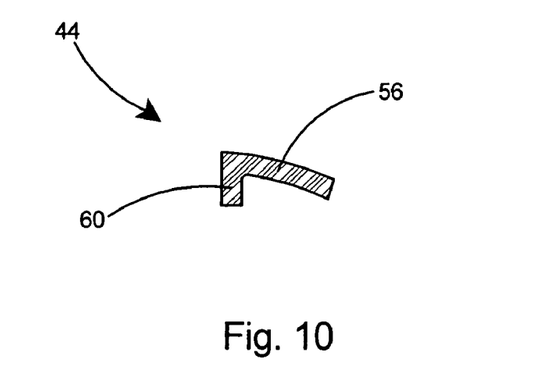
FIG. 10 is a sectional view of the leg portion of the frame member taken along line 10-10 of FIG. 8.

With reference to FIGS. 8-10 the leg members 44 each include a main leg portion 60, a brace portion 56 and a distal end 58. Slot 46 is provided extending through the inward extending flange 42 adjacent each leg 44. As shown in FIG. 10, the main leg portion 60 and brace portion 56 form a leg 44 that includes a substantially L-shaped cross-section.

Figure 11:
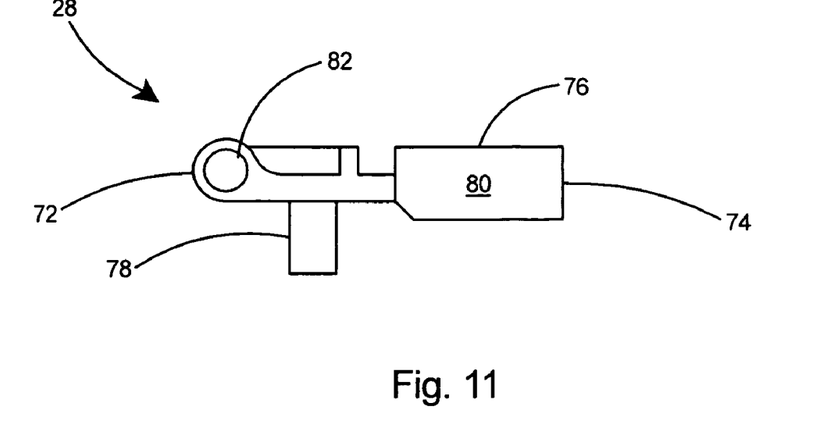
FIG. 11 is a detail view of a wing portion of the low voltage mounting device of FIG. 1.
Figure 12:
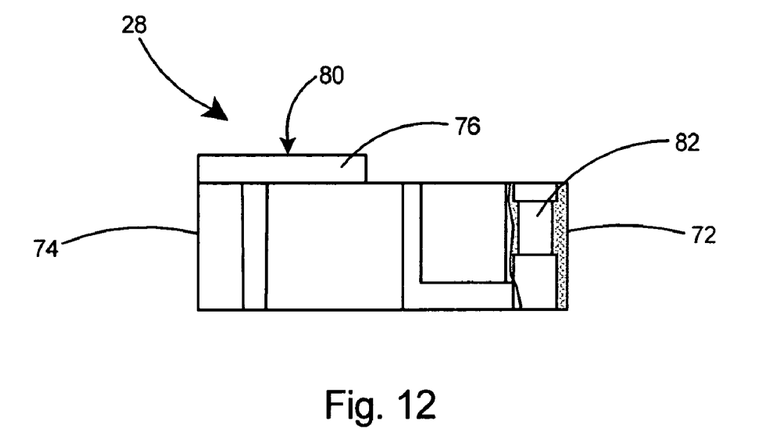
FIG. 12 is a side view of the wing of FIG. 11 with a portion broken away.
Figure 13:
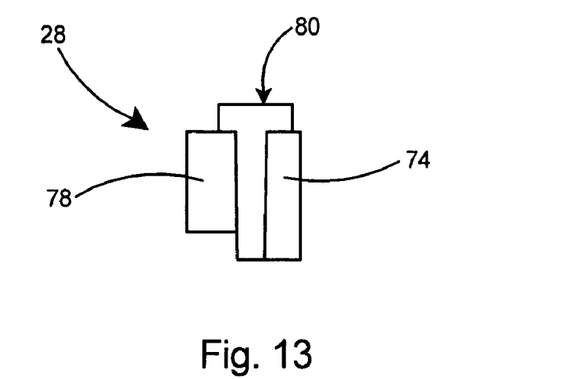
FIG. 13 is an end view of the wing of FIG. 11.

Referring to FIGS. 11-13, each rotatable wing 28 includes a proximal end 72, a distal end 74, and a foot 76 at the distal end 74. Each wing 28 further includes a tab 78 extending laterally between the two ends 72 and 74 and a flat face 80 on the outward facing side of the foot 76. A bore 82 is provided at the proximal end 72 of each wing 28.

Figure 14:
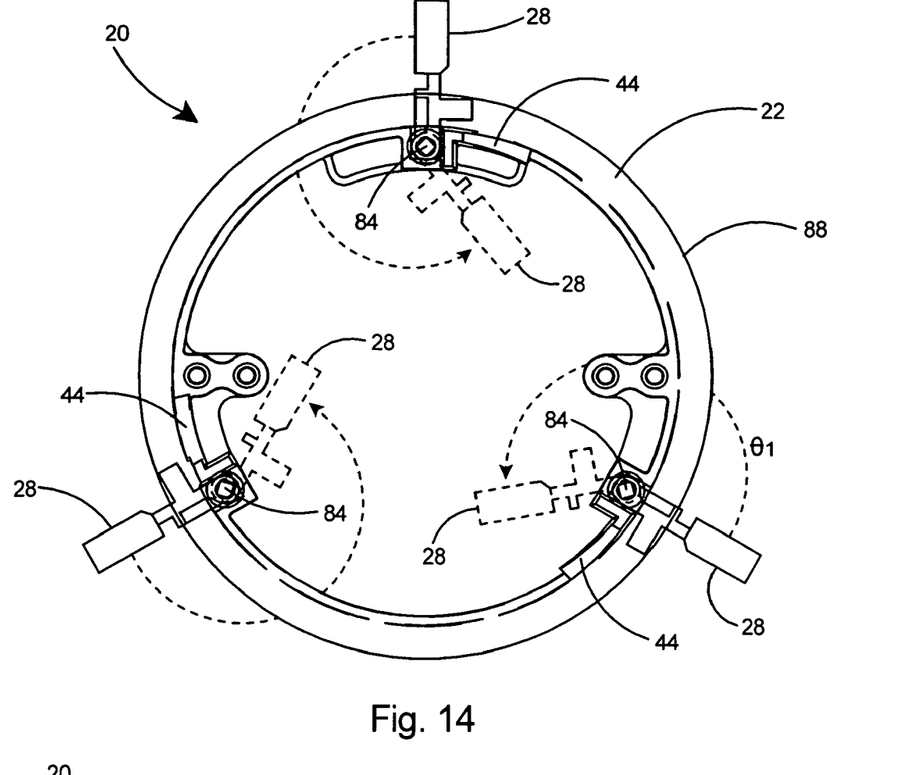
FIG. 14 is a top view of a low voltage mounting device according to the present invention.
Figure 15:
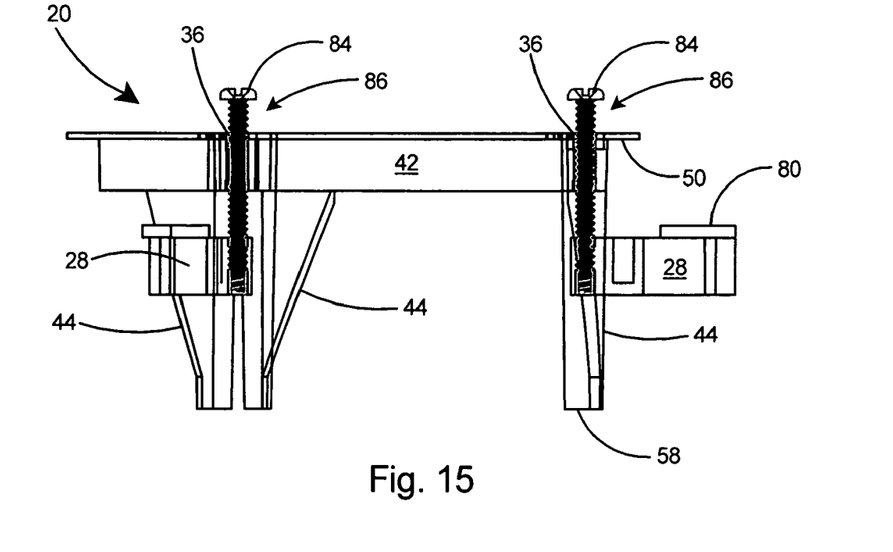
FIG. 15 is a side view of the low voltage mounting device of FIG. 14.

With reference to FIGS. 14 and 15, the low voltage mounting device 20 includes adjustable fasteners 84 extending through apertures 36 in frame member 22. A rotatable wing 28 is secured tightly to the end of each adjustable fastener 84. The adjustable fastener 84 with attached wing 28 comprise a fastening arrangement 86 for securing the low voltage mounting device 20 to the drywall (not shown) in a building. As shown in FIG. 14, the rotatable wings 28 can each be rotated counterclockwise through an angle θ1 of approximately 220° to position the wings 28 interior of the outer periphery 88 of the frame member 22. The wings 28 are positioned inward, as shown in phantom lines, to prepare the low voltage mounting device 20 for insertion in a hole (not shown) in a wall. The legs 44 act as stops to limit the angle the wings 28 can be rotated.

Figure 16:
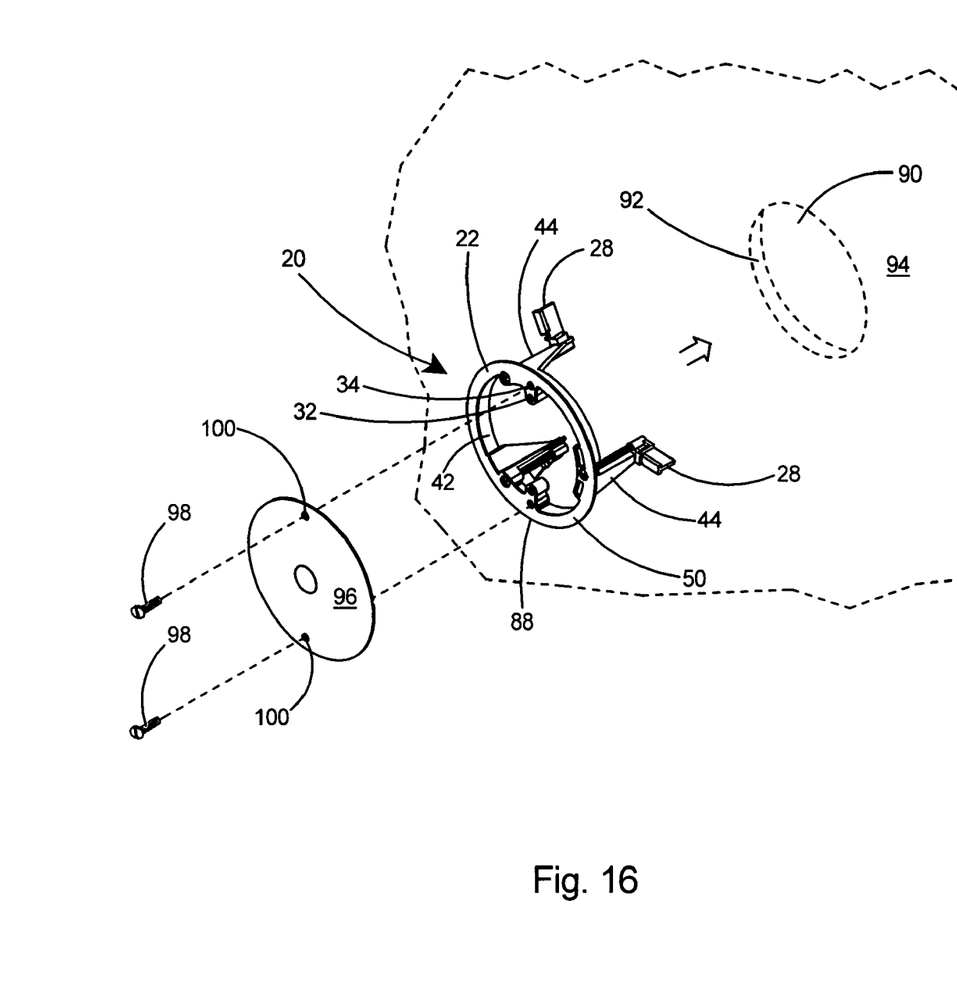
FIG. 16 is an exploded perspective view of the low voltage mounting device of the present invention in alignment with a hole in a wall in which it is to be inserted.

Reference is made to FIG. 16 for an understanding of the operation of the low voltage mounting device 20 of the present invention. FIG. 15 depicts a low voltage mounting device 20 with the rotatable wings 28 rotated counterclockwise to their full extent to place them within the outer periphery 88 of the frame member 22. A hole 90 is then made in the drywall 92 to accommodate the legs 44 and inward extending flange 42 of the low voltage mounting device 20. In an especially preferred embodiment of the low voltage mounting device 20, the outer diameter D1 of the frame member is preferably between 4.2 and 4.5 inches in diameter and the outer diameter D2 of the inward extending flange 42 is preferably between 3.85 and 3.90 inches (see FIG. 4). Therefore, for the example described herein, a conventional 4-inch diameter hole saw (not shown) would be used to create a hole 90 in the drywall 92 as shown in FIG. 16. The frame member 22 and inward extending flange 42 could of course be produced in other sizes in which case an appropriately sized hole saw would be used to create a hole in the drywall for the low voltage mounting device 20. As shown in FIG. 16, the low voltage mounting device 20 is inserted into the hole 90 until the outward extending flange 50 is flush against the wall 94 surface. A cover plate 96, which is specific to the low voltage component (not shown) that is installed in the low voltage mounting device 20 and is typically provided with the low voltage component, is shown in alignment to be secured to the low voltage mounting device 20 with cover fasteners 98 through holes 100 in the cover plate 96.

Figure 17:
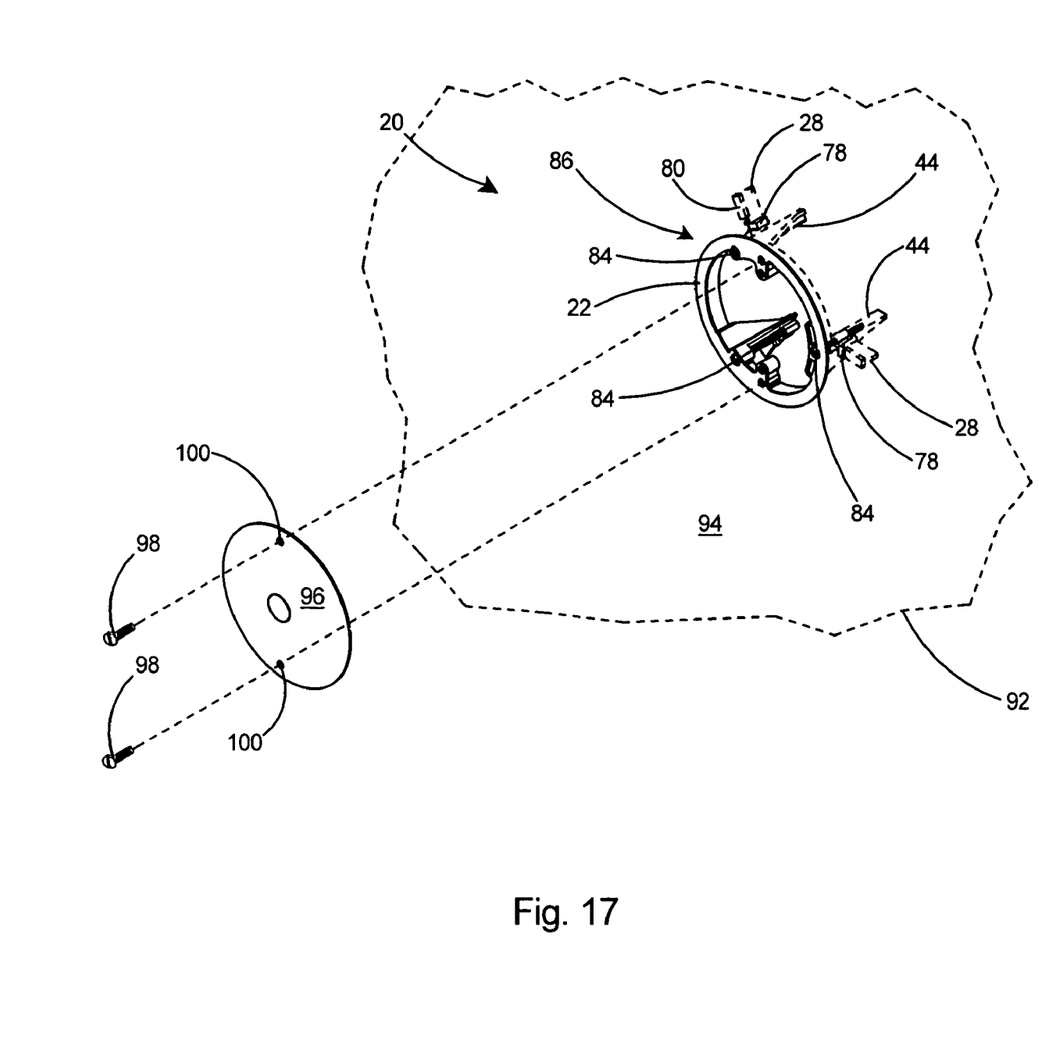
FIG. 17 is a perspective view of the low voltage mounting device of FIG. 16 after being inserted flush with the wall and with the wings rotated outward of the frame member.

With reference to FIG. 17, after the outward extending flange 50 is flush with the wall 94 surface, the adjustable fasteners 84 are turned clockwise thereby turning the rotatable wings 28 clockwise until the tabs 78 on each wing 28 come to a stop on the corresponding leg 44. With the wings 28 rotated to their full extent clockwise, they are positioned beyond the outer periphery 88 of the frame member 22 and behind the drywall 92. Continued tightening of the fastening arrangement 86, which includes tightening of each adjustable fastener 84, draws each wing 28 toward the drywall 92. Full tightening of the adjustable fasteners 84 draws the flat face 80 of each wing 28 against the drywall 92 and secures the low voltage mounting device 20 to the wall by sandwiching the drywall 92 between the wings 28 and the outward extending flange 50 of the frame member 22.

Figure 18:
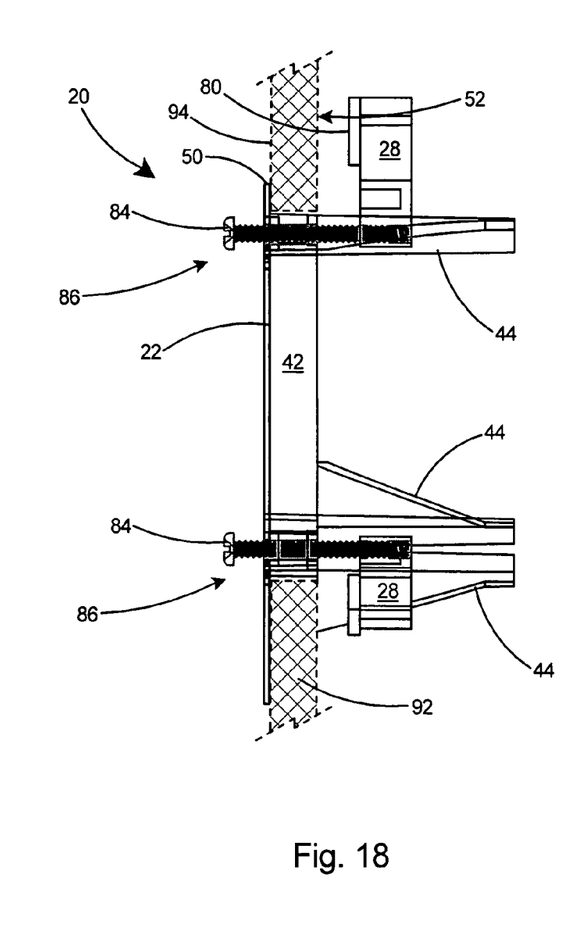
FIG. 18 is a side view of a low voltage mounting device according to the present invention with the wings rotated outward and positioned behind the wall.
Figure 19:
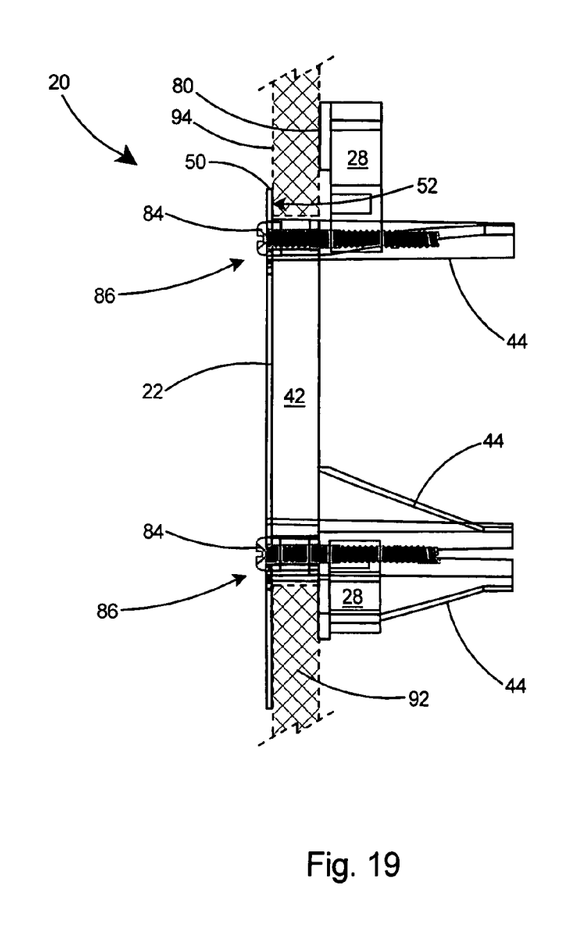
FIG. 19 is a side view of a low voltage mounting device of FIG. 18 after the wings have been secured tightly against the wall.

With reference to FIGS. 18 and 19 there is shown a sectional view of a wall and the low voltage mounting device 20 of the present invention with the fastening arrangement 86 before being tightened (see FIG. 18) and after being tightened (see FIG. 19). In FIG. 18, the rotatable wings 28 have been rotated clockwise to their outward-extended positions where they are situated behind the drywall 92. Turning the adjustable fasteners 84 clockwise will cause each wing 28 to advance toward the rear surface 52 of outward extending flange 50. In FIG. 19, the rotatable wings 28 have been tightened until the flat face 80 on each wing 28 is drawn tight against the drywall 92 thereby securing the low voltage mounting device 20 to the wall 94. The drywall is sandwiched between the flat face 80 of each wing 28 and the rear surface 52 of the outward extending flange 50. The low voltage mounting device 20 is therefore clamped to the wall 94 by the vise action of the wings 28 and the frame member 22 on each side of the drywall 92.

With reference to FIG. 1, the frame member 22 may be constructed of metal or plastic but is most preferably molded in one piece of plastic. Each of the rotatable wings 28 may also be constructed of metal or plastic but most preferably are molded in one piece of plastic. Preferred plastic material for molding the frame member and the wings include polyethylene, polypropylene, polycarbonate, polyvinylchloride, polystryrene, and acrylonitrile-butadiene styrene.

Referring to FIG. 1, the adjustable fasteners 84 are preferably constructed of metal and most preferably are at least 1.5 inches in length. The adjustable fasteners are inward of the inner periphery 102 of the inward extending flange 42. The bosses 30 extend from the inner periphery 102 of the inward extending flange 42.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A low voltage mounting device comprising:
   a generally circular one-piece frame member including an outward extending flange having an outer periphery, an inner periphery, and an inner surface;
   an inward extending flange extending from said inner surface of said outward extending flange at the said inner periphery;
   a fastening arrangement for securing said frame member to a wall;
   said fastening arrangement including a plurality of fasteners extending through said frame member, each of said fasteners including an end;
   a wing on the end of each of said fasteners, said wings including outward extending tabs thereon; and
   a plurality of legs extending from said inner surface of said outward extending flange,
   whereby tightening of one of said fasteners causes said tab of said wing to engage one of said legs thereby stopping rotation of said wing and enabling additional tightening of said fasteners to draw each of said wings toward said frame member.

2. The low voltage mounting device of claim 1 wherein said legs are substantially L-shaped and include a substantially planar main leg portion and a brace portion.

3. The low voltage mounting device of claim 2 wherein said inward extending flange includes an outer surface; said brace portion includes an outer surface; and said outer surface of said brace portion of each of said legs is flush with said outer surface of said inward extending flange.

4. The low voltage mounting device of claim 2 wherein said inward extending flange is circular shaped with an outer surface; said brace portion of said leg is an integral extension of said inward extending flange; and said brace portion includes an arcuate surface even with said outer surface of said inward extending flange.

5. The low voltage mounting device of claim 1 wherein said inward extending flange includes an inner periphery; and said fasteners of said fastening arrangement are inward of said inner periphery of said inward extending flange.

6. The low voltage mounting device of claim 5 including one or more bosses integral with said frame member.

7. The low voltage mounting device of claim 6 wherein said bosses extend from said inner periphery of said inward extending flange.

8. The low voltage mounting device of claim 7 wherein said bosses include one or more bores therein.

9. The low voltage mounting device of claim 8 wherein said bosses include two of said bores including an inner bore and an outer bore with said inner bore being nearer the center of said generally circular frame member than said outer bore.

10. The low voltage mounting device of claim 6 wherein each of said bosses is adjacent one of said legs; and said frame member includes a shelf bridging between each of said bosses and each of said adjacent legs.

11. The low voltage mounting device of claim 1 wherein each of said wings includes a proximal end and a distal end; said proximal end of each of said wings includes a bore therein; and said distal end includes a foot thereon.

12. The low voltage mounting device of claim 11 wherein said foot of each of said wings includes a flat face thereon.

13. The low voltage mounting device of claim 1 wherein said frame member is molded in one piece of plastic.

14. The low voltage mounting device of claim 13 wherein said plastic is selected from the group including polyethylene, polypropylene, polycarbonate, polyvinylchloride, polystryrene, and acrylonitrile-butadiene styrene.

15. The low voltage mounting device of claim 1 wherein said inward extending flange includes a slot therein adjacent each of said legs; and said slots in said inward extending flange accepting said wings therein when said fastening arrangement is in a fully tightened state.

16. The low voltage mounting device of claim 1 wherein said wings are each molded in one piece of plastic.

17. The low voltage mounting device of claim 16 wherein said plastic is selected from the group including polyethylene, polypropylene, polycarbonate, polyvinylchloride, polystryrene, and acrylonitrile-butadiene styrene.

18. The low voltage mounting device of claim 16 wherein said fasteners are at least 1.5 inches in length.

* * * * *